(12) United States Patent
Huang

(10) Patent No.: US 10,580,365 B2
(45) Date of Patent: Mar. 3, 2020

(54) DISPLAY EQUIPMENT AND DISPLAY METHOD

(71) Applicant: DELTA ELECTRONICS, INC., Taoyuan (TW)

(72) Inventor: June-Jei Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/052,595

(22) Filed: Aug. 1, 2018

(65) Prior Publication Data
US 2019/0272793 A1 Sep. 5, 2019

(30) Foreign Application Priority Data
Mar. 2, 2018 (CN) .......................... 2018 1 0175078

(51) Int. Cl.
*G09G 3/34* (2006.01)
*G02B 3/00* (2006.01)

(52) U.S. Cl.
CPC ......... *G09G 3/3413* (2013.01); *G02B 3/0062* (2013.01); *G09G 2320/0626* (2013.01); *G09G 2340/0414* (2013.01)

(58) Field of Classification Search
CPC .... G06F 1/1601; G06F 1/1637; G06F 1/1626; G06F 1/1652; G06F 1/1686; H04N 5/2253; H04N 5/2257; H04N 5/2254; G09F 9/301
See application file for complete search history.

(56) References Cited

U.S. PATENT DOCUMENTS 6,061,179 A * 5/2000 Inoguchi ............ G02B 27/2214
359/464
6,533,420 B1 * 3/2003 Eichenlaub ........ G02B 27/2214
353/7
(Continued)

FOREIGN PATENT DOCUMENTS

CN 101551546 A 10/2009
CN 102770901 A 11/2012
(Continued)

OTHER PUBLICATIONS

Lu Fang, Oscar C. Au, Jingjing Dai, Hanli Wang, Ngai-Man Cheung,"Analytical Study of RGB Vertical Stripe and RGBX Square-Shaped Subpixel Arrangements" Proc. of IEEE International Conference on Image Processing (ICIP), Sep. 2012.p. 333-336.
(Continued)

*Primary Examiner* — Carolyn R Edwards
(74) *Attorney, Agent, or Firm* — CKC & Partners Co., LLC

(57) ABSTRACT

Display equipment includes a display device, a backlight device, a first cylindrical lens array and a second cylindrical lens array. The display device includes multiple display units. At least three adjacent display elements are used to display at least one pixel in an image. The backlight device is configured to generate multiple first incident light and multiple second incident light. The first cylindrical lens array and the second cylindrical lens array are configured to refract the first incident light and the second incident light. After the first cylindrical lens array and the second cylindrical lens array refract the first incident light and the second incident light time-sequentially, the light will be projected at the positions with different vertical heights on the display units.

18 Claims, 5 Drawing Sheets

(56) References Cited

U.S. PATENT DOCUMENTS

| | | | | |
|---|---|---|---|---|
| 7,446,733 B1* | 11/2008 | Hirimai | .................. | G02B 3/005 |
| | | | | 345/32 |
| 9,055,288 B2* | 6/2015 | Goulanian | ......... | G02B 27/2214 |
| 9,182,606 B2* | 11/2015 | Goulanian | ............. | G03B 35/18 |
| 9,519,153 B2* | 12/2016 | Robinson | ............. | G02B 6/0073 |
| 2007/0008617 A1* | 1/2007 | Shestak | .............. | G02B 27/2214 |
| | | | | 359/455 |
| 2008/0037117 A1* | 2/2008 | Seki | ....................... | G02B 21/62 |
| | | | | 359/446 |
| 2008/0192356 A1* | 8/2008 | Hamagishi | ......... | G02B 27/2214 |
| | | | | 359/619 |
| 2014/0132863 A1* | 5/2014 | Chang | ................ | G02B 27/2214 |
| | | | | 349/15 |
| 2014/0267639 A1* | 9/2014 | Tatsuta | ................. | H04N 13/351 |
| | | | | 348/59 |
| 2016/0360187 A1* | 12/2016 | Smithwick | ........... | H04N 13/398 |
| 2019/0011718 A1* | 1/2019 | Roelen | ............... | G02B 27/2214 |

FOREIGN PATENT DOCUMENTS

| | | | |
|---|---|---|---|
| JP | 4034022 B2 | 1/2008 | |
| TW | 201224515 A1 | 6/2012 | |

OTHER PUBLICATIONS

L. Fang, O. C. Au, N. Cheung, "Subpixel Rendering: From Font Rendering to Image Subsampling", IEEE Signal Processing Magazine (SPM), vol. 30, No. 3, pp. 177-189, May 2013.

* cited by examiner

```
┌─────────────────────────────────────────────────────┐
│ the processor 130 transmits a control signal to the │
│ backlight device 300 and the display device 200     │
│ according to an image signal so that the first      │
│ light unit 310 and the second light unit 320        │──── S501
│ in the backlight device 300 sequentially project    │
│ the first incident light and the second incident    │
│ light                                               │
└─────────────────────────────────────────────────────┘
                         │
                         ▼
┌─────────────────────────────────────────────────────┐
│ Through the first lenticular lens array 110, the    │
│ first incident light L11 and the second incident    │
│ light L21 are refracted to form the                 │──── S502
│ first refracted light L12 and the second refracted  │
│ light L22                                           │
└─────────────────────────────────────────────────────┘
                         │
                         ▼
┌─────────────────────────────────────────────────────┐
│ the first refracted light L12 and the second        │
│ refracted light L22 are refracted by the second     │
│ lenticular lens array 120 into the first            │
│ backlight light L13 and the second backlight light  │
│ L23 such that the projection directions of the      │──── S503
│ first backlight light L13 and the second backlight  │
│ light L23 are interlaced with each other in the     │
│ vertical direction                                  │
└─────────────────────────────────────────────────────┘
                         │
                         ▼
┌─────────────────────────────────────────────────────┐
│ the first backlight light L13 and the second        │
│ backlight light L23 sequentially pass through the   │
│ display units 200 on the non-overlapping positions  │──── S504
│ of the display units, and setting at least three    │
│ adjacent the display elements in the horizontal     │
│ direction to display at least one pixel of an image.│
└─────────────────────────────────────────────────────┘
```

Fig. 5

DISPLAY EQUIPMENT AND DISPLAY METHOD

RELATED APPLICATIONS

This application claims priority to China Application Serial Number 201810175078.5, filed Mar. 2, 2018, which is herein incorporated by reference in its entirety.

BACKGROUND

Technical Field

The present disclosure relates to a display equipment, and more particularly, a technique for improving the display effect of horizontal and vertical directions according to the order of arrangement of display units and lenticular lens arrays.

Description of Related Art

Currently, there are display panels on the market that can display "8K" high-resolution images with a display size of 7680×4320 to provide consumers with more detailed image performance. However, since the "8K" high-resolution projection technology must match the corresponding hardware equipment, resulting in high production costs and market prices, it is difficult to become the mainstream of the market.

In order to respond to market demand, how to use lower-level hardware equipment, improve its display technology and improve display performance of output image, which is the main purpose of the present disclosure.

SUMMARY

One aspect of the present disclosure is a display equipment. The display equipment includes a display device, a backlight device, a first lenticular lens array and a second lenticular lens array. The display device includes multiple display elements. The display elements sequentially arranged on the display device according to colors displayed by the plurality of display elements, and at least three adjacent the display elements are configured to display at least one pixel of an image. The backlight device is configured to generate a plurality of first incident light and a plurality of second incident light. The first lenticular lens array includes multiple first lenticular lenses, which is arranged in a vertical direction sequentially. The convex surfaces of the first lenticular lens configured to face the display device. The second lenticular lens array includes multiple second lenticular lenses, which is arranged in the vertical direction sequentially. The convex surfaces of the second lenticular lens configured to face the first lenticular lens array. After the first incident light and the second incident light sequentially are refracted by the plurality of first lenticular lens and the plurality of second lenticular lens, the first incident light and the second incident light are projected onto positions at different vertical heights on the display elements.

Another aspect of the present disclosure is a display method. The display method includes the following steps. Projecting multiple first incident light and multiple second incident light sequentially through a backlight device of a display equipment. Refracting the first incident light and the second incident light sequentially through a first lenticular lens array and a second lenticular lens array to respectively form multiple first backlight light and multiple backlight light, and the first backlight light and the second backlight light are arranged in the vertical direction and interlaced with each other. Through a display device, allowing the first backlight light and the second backlight light to pass through a plurality of display elements on the display device. The display elements are sequentially arranged on the display device according to colors displayed by the plurality of display elements, and at least three adjacent the display elements are configured to display at least one pixel of an image.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows:

FIG. 5 is a flowchart illustrating a display method in some embodiments of the present disclosure.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
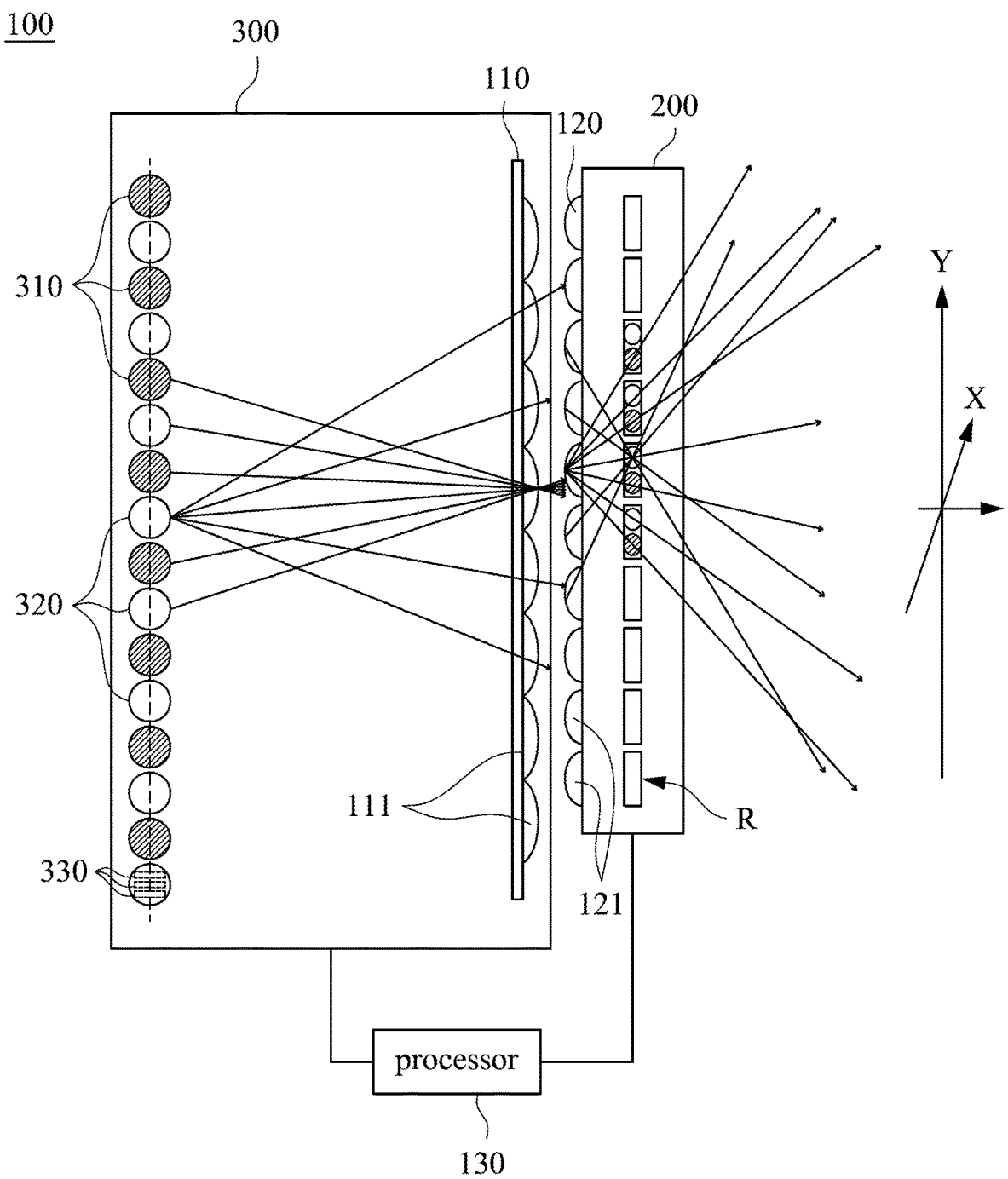
FIG. 1 is a schematic diagram of a display equipment in some embodiments of the present disclosure.

Refer to FIG. 1, FIG. 1 is a schematic diagram of a display equipment 100 in some embodiments of the present disclosure. In some embodiments, the display equipment 100 includes at least a display device 200, a backlight device 300, a first lenticular lens array 110 and a second lenticular lens array 120. The display device 200 includes multiple display elements R, which configured to display multiple pixels of an image. In some embodiments, the display device 200 may be a liquid crystal display panel, including an active array element substrate, a color filter array, a polarizer, a liquid crystal layer, a Polyimide layer. That is, the display element R can be a liquid crystal molecule and a filter. The display equipment 100 includes a processor 130. The processor 130 may send a control signal to the display device 200 to adjust the light passing rate of the display element R at different time so that each display element R displays different colors.

Figure 2A:
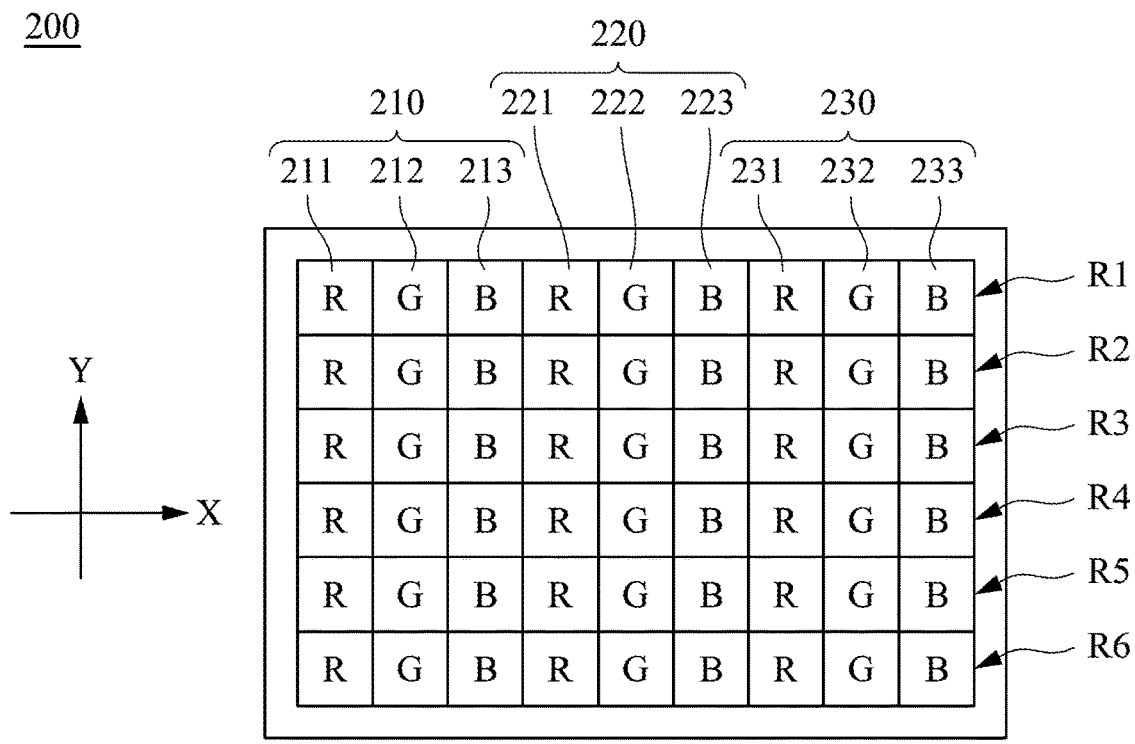
FIG. 2A is a schematic diagram of a display device in some embodiments of the present disclosure.

Refer FIG. 1 and FIG. 2A. In some embodiments, the display device 200 includes multiple sets of display units 210, 220, 230. Each set of display units 210-230 includes a first display element 211, 221, 231, a second display element 212, 222, 232, and a third display element 213, 223, 233, respectively. The display elements 211 to 213, 221 to 223, and 231 to 233 are configured to display different colors and arranged in a horizontal direction sequentially. For example, the primary colors of light, red (R in FIG. 2A), green (G in FIG. 2A), and blue (B in FIG. 2A). However, in other embodiments, each set of display units 210-230 can be configured to display three or more different colors (e.g., red, green, blue and yellow). In the conventional method, the display device sets each set of display units 210-230 to display a pixel of an image. The present disclosure improves the display method described above.

In addition, the display element R illustrated in FIG. 1 is the same element as the display elements 211 to 213, 221 to 223, and 231 to 233 illustrated in FIG. 2A. In order to make the features of the display element easier to understand, In FIG. 2A, the display elements R are divided into 211-213, 221-223, and 231-233 in the horizontal direction. The display elements R are divided into R1-R6 in the vertical direction.

Figure 2B:
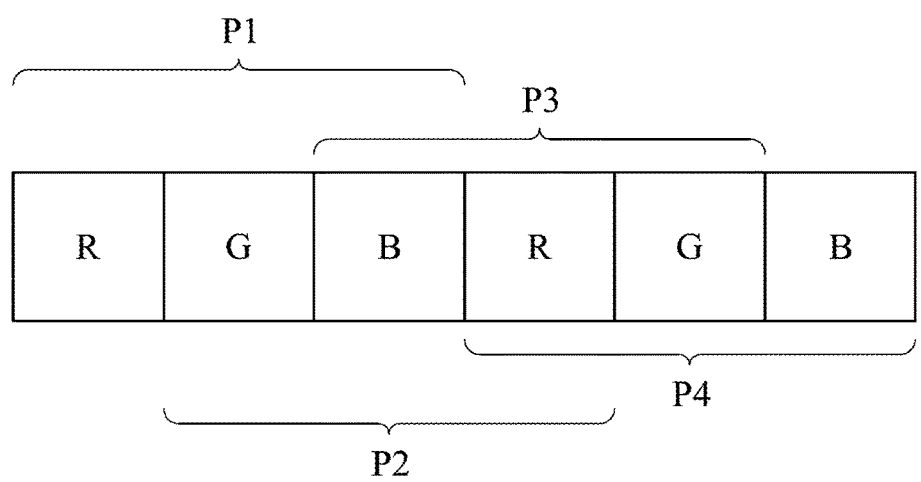
FIG. 2B is a schematic diagram of a portion of the display device in some embodiments of the present disclosure.

In some embodiments, the display elements 211-213, 221-223, 231-233 of each set of the display units 210-230 are arranged in a predetermined order. For example, along the horizontal direction (e.g., the X-axis direction shown in FIG. 2A) and arranged in the order of red, green, and blue. At least three adjacent display elements display the at least one pixel of the image. In some embodiments, two adjacent pixels in the image are combined and displayed by at least one same display element and at least one other display element. For example, the image comprises a first pixel and a second pixel adjacent to each other, the first pixel and the second pixel are composed and displayed by at least one same display element and at least one other display element. As shown in FIG. 2B, when display elements are arranged in RGBRGB, the display equipments 100 sequentially set RGB, GBR, BRG, and RGB in the vertical direction to display different pixels P1 to P4. That is, the same display element can be used to display multiple pixels of the image, so that the resolution effect can be increased in the horizontal direction.

The backlight device 300 is configured to generate multiple first incident light and multiple second incident light. The first lenticular lens array 110 is optically coupled between the backlight device 300 and the display device 200 and has an optical display capability in the vertical direction. The first lenticular lens array 110 includes a multiple first lenticular lens 111. The first lenticular lens 111 is arranged in the vertical direction sequentially (as shown in the Y-axis direction in FIG. 1). Planar surfaces of the first lenticular lens 111 face the backlight device 300, and convex surfaces of the first lenticular lens 111 faces the display device 200. The first lenticular lens 111 is configured to change the direction of the first incident light and the second incident light. When the first incident light and the second incident light pass through the first lenticular lens 111, they can be refracted into the first refracted light and the second refracted light, and shifted in different directions. For example, first refracted light shifts upward and second refracted light shifts downward.

The second lenticular lens array 120 is optically coupled between the backlight device 300 and the display device 200 and has an optical display capability in the vertical direction. The second lenticular lens array 120 includes multiple second lenticular lens 121. The second lenticular lens 121 is sequentially arranged in the vertical direction. The planar surfaces of the second lenticular lens 121 face the display device 200. The convex surfaces of the second lenticular lens 121 face the convex surfaces of the first lenticular lens 111. The second lenticular lens 121 is configured to adjust the first refracted light and the second refracted light to a uniform backlight. Accordingly, after the first refracted light and the second refracted light are refracted by the second lenticular lens as the first backlight light and the second backlight light, and the first backlight light and the second backlight light are projected onto positions at different vertical heights on the display elements of the display device 200. The configuration of the first lenticular lens array 110 and the second lenticular lens array 120 can be understood by one skilled in the art, so it is not described here.

In some embodiments, the backlight device 300 includes multiple first light unit 310 and multiple second light unit 320. The first light units 310 and the second light units 320 are arranged in the vertical direction and interlaced with each other. The backlight device 300 controls the first light unit 310 and the second light unit 320 so that the first light unit 310 and the second light unit 320 sequentially project the first incident light and the second incident light at different times. For example, in the odd seconds (e.g., 1, 3, 5), the first light unit 310 projects a first incident light, and the second light unit 320 is turned off. At this time, the processor 130 will change the light passing rate of the display elements to display the predetermined color of the corresponding pixel. In contrast, in the even seconds (e.g., 2, 4, 6), the first light unit 310 is turned off, and the second light unit 320 projects the second incident light. At this point, the processor 130 also changes the light passing rate of the display element to display the predetermined color of the corresponding pixel. Accordingly, after the first incident light and the second incident light are refracted as the first backlight light and the second backlight light, the first backlight light and the second backlight light are projected onto positions at different vertical heights on the display elements at different times. Therefore, for the user's viewing, a display element can be configured to display two pixels, so that the resolution of the display equipment 100 in the vertical direction can be doubled.

The present disclosure defines multiple pixels by sorting the display element in the vertical direction to improve the resolution of the horizontal direction. In addition, the first incident light and the second incident light are sequentially projected through the backlight device 300 so as to project onto positions at different vertical heights on the display element, so that the resolution of the vertical direction is doubled. Accordingly, display performance of the display equipment 100 can be improved without changing the hardware of the display device 200.

Figure 3A:
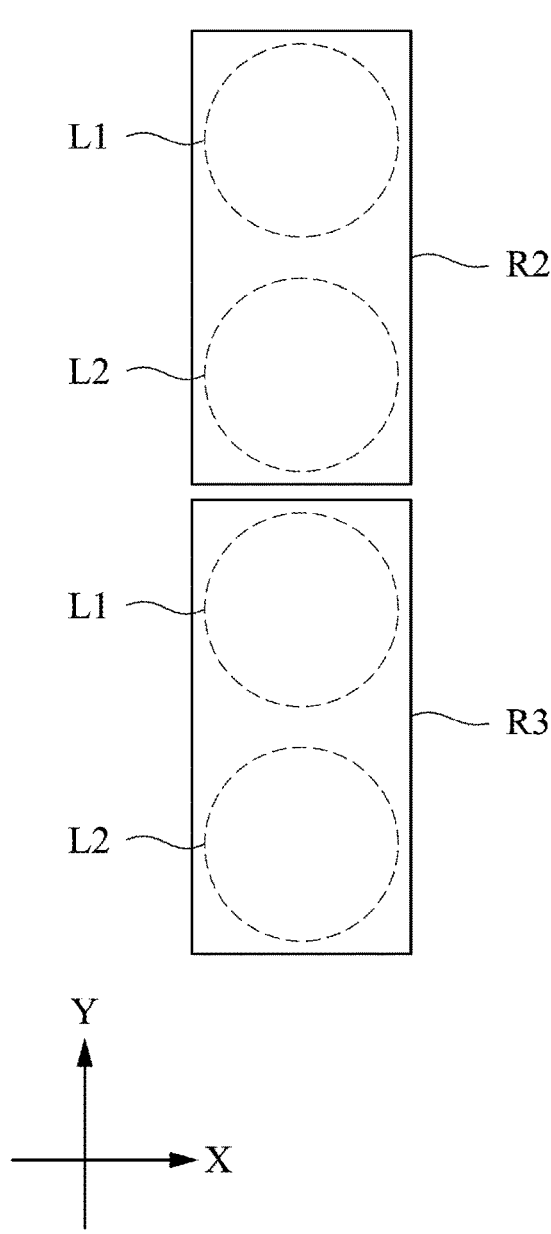
FIG. 3A is a schematic diagram of the projection of first backlight light and second backlight light in some embodiments of the present disclosure.

Refer FIG. 1 and FIG. 3A, in some embodiments, the first lenticular lens array 110 focuses the first incident light and the second incident light at different vertical heights through different angles to refract and generate the first refracted light and the second refracted light. Then, after passing through the second lenticular lens array 120, the first refracted light and the second refracted light become first backlight light and second backlight light. The first backlight light and the second backlight light are projected on an upper portion or a lower portion of the same display elements R, and the projection positions of the first backlight light and the second backlight light are independent. For example, the first backlight light L1 is projected on the upper portion of display elements R1-R6 in the same column. The second backlight light L2 is projected on the lower portion of the display elements R1-R6 in the same column.

Figure 3B:
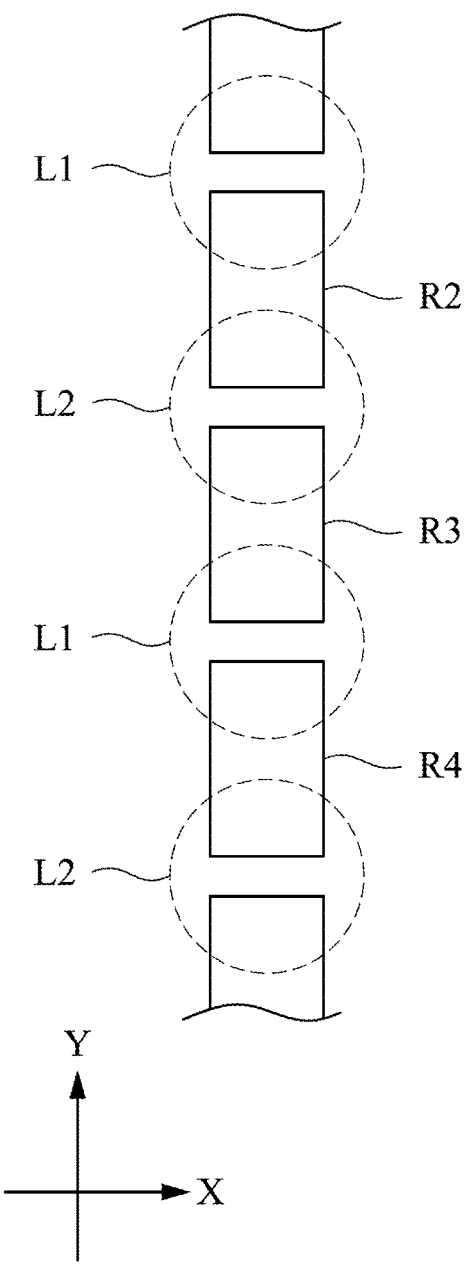
FIG. 3B is a schematic diagram of the projection of first backlight light and second backlight light in some embodiments of the present disclosure.

However, the positions of the first backlight light L1 and the second backlight light L2 are not limited to the upper portion or the lower portion of the same display element R1 to R6. As long as the projection positions of the first backlight light L1 and the second backlight light L2 are arranged in the vertical direction and interlaced with each other, the technology of the present disclosure can be realized. In other embodiments, the first backlight light L1 and the second backlight light L2 are respectively projected on an upper portion and a lower portion of two adjacent different display elements R1-R6 in the vertical direction, and the projection positions of the first backlight light L1 and the second backlight light L2 are independent. As shown in FIG. 3B, the first backlight light L1 is projected on the lower portion of the display element R3 and the upper portion of the display element R4. The second backlight light L2 is projected on the lower portion of the display element R2 and the upper portion of the display element R3.

In addition, as shown in FIG. 3B, in some embodiments, the projection area of the first backlight light L1 and the second backlight light L2 covers the space between the display elements R1 to R6. Therefore, in order to uniformly project the first backlight light L1 and the second backlight light L2 on the display elements R1 to R6, each of the light units 310, 320 may include multiple light emitting diodes 330 (as shown in FIG. 1) to ensure the brightness of light.

As shown in FIG. 3A, in some embodiments, the projection areas of the first backlight light L1 and the second backlight light L2 projected on the display elements R1-R6 are equal to half the area of the display elements R1-R6. In some embodiments, the projection areas of the first backlight light L1 and the second backlight light L2 on the display elements R1-R4 are equal to the area of the display elements R1-R4. In addition, in some embodiments, vertical positions of the second lenticular lens 121 corresponds to vertical positions of the display elements R1-R4.

Figure 4:
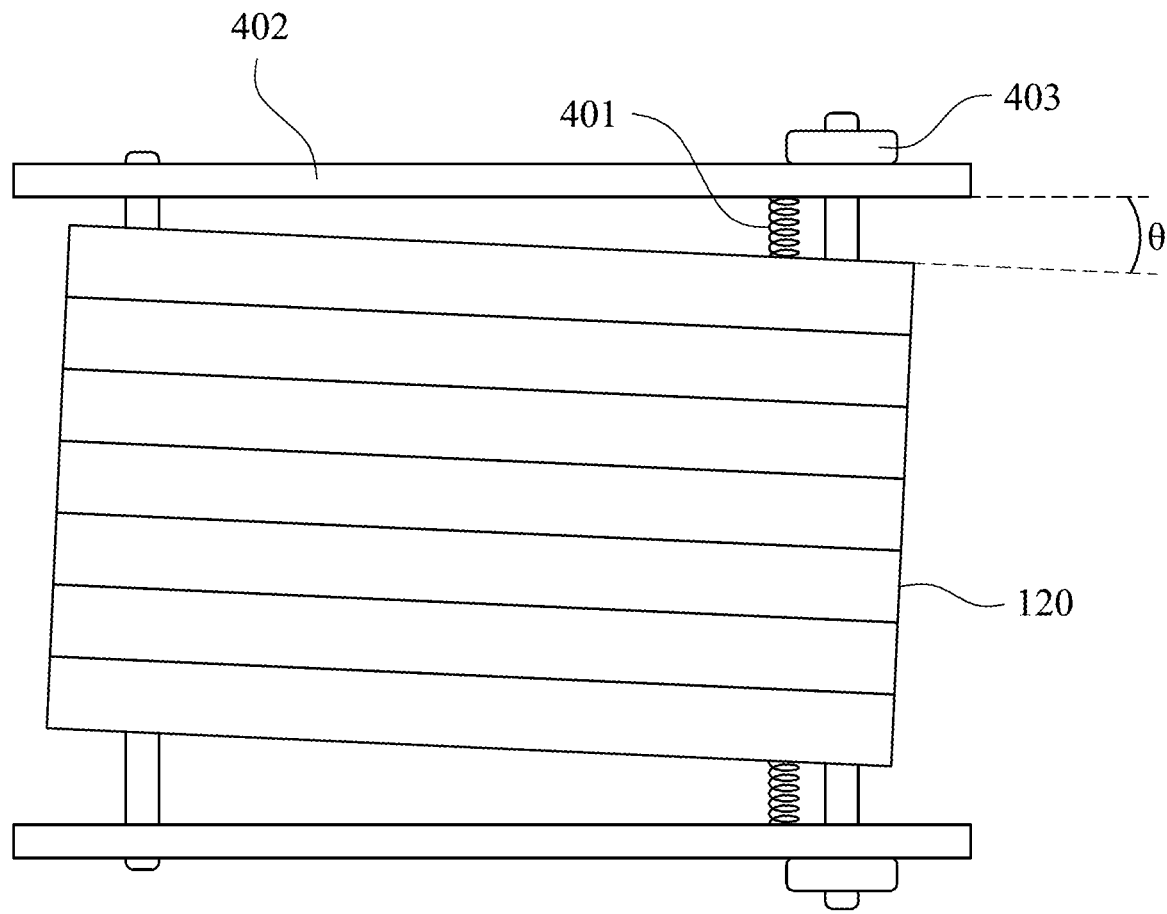
FIG. 4 is a schematic diagram illustrating the adjustment of the second lenticular lens array in some embodiments of the present disclosure.

Referring to FIG. 4, the first side of the second lenticular lens array 120 is inclined toward the vertical direction so that an inclination angle θ is maintained between the second lenticular lens array 120 and the display device 200 (or the horizontal line of the display equipment 100). According to this, the first incident light and the second incident light can be kept at the inclination angle θ in the horizontal direction, so as to avoid display effects due to Moiré patterns. In some embodiments, the second lenticular lens array 120 is arranged on a frame 402 in the display equipment 100. The first side of the second lenticular lens array 120 is fixed to the frame 402 through the spring 401. The frame 402 is provided with a locking element 403 (e.g., a nut and a screw). When the user rotates the locking element 403, the vertical height of the first side of the second lenticular lens array 120 will change accordingly. At this time, the inclination angle θ can be adjusted by the elastic restoring force of the spring 401.

Please refer to FIG. 5, which is a flow chart of the steps of some embodiments of the present disclosure. The display equipment 100 generates a high resolution image according to the following method. In step S501, the processor 130 transmits a control signal to the backlight device 300 and the display device 200 according to an image signal so that the first light unit 310 and the second light unit 320 in the backlight device 300 sequentially project the first incident light and the second incident light.

In step S502, the first incident light L11 is shifted upward through the first lenticular lens array 110 to form a multiple first refracted light L12. The first lenticular lens array 110 can also shift the second incident light L21 downward to form the second refracted light L22.

In step S503, the first refracted light L12 and the second refracted light L22 are refracted by the second lenticular lens array 120 into the first backlight light L1 and the second backlight light L2 such that the projection directions of the first backlight light L1 and the second backlight light L2 are interlaced with each other in the vertical direction.

In step S504, the display device 200 is configured to allow the first backlight light L1 and the second backlight light L2 to pass sequentially through the display units 200 on the non-overlapping positions of the display units. The display elements 100 (e.g., the processor 130 or the computing module in the display device 200) sequentially arranged on the display device according to colors displayed by the plurality of display elements, and at least three adjacent the display elements configured to display at least one pixel of an image. Accordingly, when the display device 200 changes the light passing rate of the display element according to the control signal, it can simulate a higher resolution in the horizontal direction and increase the resolution double in the vertical direction.

As above, the vertical height of the first side of the second lenticular lens array 120 can be adjusted by the spring 401 so that the first backlight light L1 and the second backlight light L2 maintain the inclination angle θ with the horizontal direction of the display device 200 so as to avoid Moiré patterns.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A display equipment, comprising:
   a display device comprising a plurality of display elements, the plurality of display elements sequentially arranged on the display device according to colors displayed by the plurality of display elements, and at least three adjacent the display elements configured to display at least one pixel of an image;
   a backlight device configured to generate a plurality of first incident light and a plurality of second incident light; wherein the backlight device comprises a plurality of first light units and a plurality of second light units, and the plurality of first light units and the plurality of second light units are arranged in the vertical direction and interlaced with each other, the plurality of first light units and the plurality of second light units sequentially project the first incident light and the second incident light at different times;
   a first lenticular lens array comprising a plurality of first lenticular lenses arranged in a vertical direction sequentially, and convex surfaces of the first lenticular lens configured to face the display device; and a second lenticular lens array comprising a plurality of second lenticular lenses arranged in the vertical direction sequentially, and convex surfaces of the second lenticular lens configured to face the first lenticular lens array; after the plurality of first incident light and the plurality of second incident light sequentially refracted by the plurality of first lenticular lens and the plurality of second lenticular lens, the plurality of first incident light and the plurality of second incident light projected onto positions at different vertical heights on the display elements.

2. The display equipment of claim 1, wherein the display device comprises a plurality sets of display units, each set of the display unit at least comprises a first display element, a second display element and a third display element for displaying different colors respectively; the plurality sets of display units are arranged sequentially such that at least three adjacent of the first display element, the second display element and the third display element display the at least one pixel of the image.

3. The display equipment of claim 2, wherein the image comprises a first pixel and a second pixel adjacent to each other, the first pixel and the second pixel are composed and displayed by at least one same display element and at least one other display element.

4. The display equipment of claim 2, wherein the first display element, the second display element and the third display element are arranged in a horizontal direction sequentially.

5. The display equipment of claim 1, wherein after the first incident light and the second incident light are sequentially refracted by the plurality of first lenticular lenses and the plurality of second lenticular lenses, a first backlight light and a second backlight light are respectively formed, the first backlight light and the second backlight light are projected on an upper portion or a lower portion of the same display element, and the projection positions of the first backlight light and the second backlight light are independent.

6. The display equipment of claim 1, wherein after the first incident light and the second incident light are sequentially refracted by the plurality of first lenticular lenses and the plurality of second lenticular lenses, a first backlight light and a second backlight light are respectively formed, the first backlight light and the second backlight light are respectively projected on an upper portion and a lower portion of two adjacent different display elements, and the projection positions of the first backlight light and the second backlight light are independent.

7. The display equipment of claim 1, wherein vertical positions of the plurality of second lenticular lens correspond to vertical positions of the plurality of display elements.

8. The display equipment of claim 1, wherein the plurality of first light units and the plurality of second light units respectively comprise a plurality of light emitting diodes.

9. The display equipment of claim 1, wherein a first side of the second lenticular lens array is inclined toward the vertical direction so that an inclination angle is maintained between the second lenticular lens array and the display device.

10. The display equipment of claim 9, wherein the first side of the second lenticular lens array is fixed to the display device through a spring, and the spring is configured to adjust the inclination angle.

11. The display equipment of claim 1, wherein the display device changes a light passing rate of the plurality of display elements at different time points according to a control signal.

12. A display method, comprising:
projecting a plurality of first incident light and a plurality of second incident light sequentially at different times through a backlight device of a display equipment, which are arranged in the vertical direction and interlaced with each other;
refracting the first incident light and the second incident light sequentially through a first lenticular lens array and a second lenticular lens array to respectively form a plurality of first backlight light and a plurality of backlight light, and the plurality of first backlight light and the plurality of second backlight light arranged in the vertical direction and interlaced with each other; and
through a display device, allowing the first backlight light and the second backlight light to pass through a plurality of display elements on the display device; the plurality of display elements sequentially arranged on the display device according to colors displayed by the plurality of display elements, and at least three adjacent the display elements configured to display at least one pixel of an image.

13. The display method of claim 12, further comprising:
setting at least three adjacent in a horizontal direction of the plurality of display elements, which configured to display different colors respectively, to display the at least one pixel of the image through the display equipment.

14. The display method of claim 12, further comprising:
through the first lenticular lens array, shifting the plurality of first incident light upward to form a plurality of first refracted light, and shifting the plurality of second incident light downward to form a plurality of second refracted light; and
through the second lenticular lens array, refracting the first refracted light and the second refracted light to the first backlight light and the second backlight light.

15. The display method of claim 14, wherein the first backlight light and the second backlight light are projected on an upper portion or a lower portion of the same display element, and the projection positions of the first backlight light and the second backlight light are independent.

16. The display method of claim 14, wherein the first backlight light and the second backlight light are respectively projected on an upper portion and a lower portion of two adjacent different display elements, and the projection positions of the first backlight light and the second backlight light are independent.

17. The display method of claim 14, further comprising:
through the second lenticular lens array, shifting the plurality of first refracted light or the plurality of second refracted light by an inclination angle such that there is the inclination angle between projection positions of the plurality of first refracted light and second refracted light and a horizontal line of the display device.

18. The display method of claim 12, further comprising:
through the display equipment, changing a light passing rate of the plurality of display elements when the first backlight light and the second backlight light are projected on the display device.

* * * * *